United States Patent
Goldfarb et al.

(10) Patent No.: US 6,935,109 B2
(45) Date of Patent: Aug. 30, 2005

(54) MONOPROLELLANT/HYPERGOLIC POWERED PROPORTIONAL ACTUATOR

(75) Inventors: Michael Goldfarb, Franklin, TN (US); Joseph Wehrmeyer, Brentwood, TN (US); Eric Barth, Nashville, TN (US); Alvin Strauss, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 10/490,883

(22) PCT Filed: Sep. 26, 2002

(86) PCT No.: PCT/US02/30778
§ 371 (c)(1),
(2), (4) Date: Nov. 9, 2004

(87) PCT Pub. No.: WO03/027045
PCT Pub. Date: Apr. 3, 2003

(65) Prior Publication Data
US 2005/0044851 A1 Mar. 3, 2005

Related U.S. Application Data
(60) Provisional application No. 60/325,312, filed on Sep. 27, 2001.

(51) Int. Cl.[7] .................................................. F03C 5/00
(52) U.S. Cl. ............................. 60/530; 60/649; 60/721
(58) Field of Search .......................... 60/530, 531, 649, 60/721

(56) References Cited

U.S. PATENT DOCUMENTS

| | | | | |
|---|---|---|---|---|
| 3,581,504 A | | 6/1971 | Andrus | 60/259 |
| 3,601,827 A | | 8/1971 | Miller | 9/8 |
| 3,636,710 A | * | 1/1972 | Lovingham et al. | 60/231 |
| 3,732,693 A | * | 5/1973 | Chu | 60/207 |
| 3,740,945 A | * | 6/1973 | Lovingham | 60/204 |
| 4,385,489 A | * | 5/1983 | Abbott | 60/776 |
| 4,513,603 A | * | 4/1985 | Baillie | 73/37 |
| 4,825,819 A | | 5/1989 | Morash | 123/46 R |
| 5,807,011 A | | 9/1998 | Hong et al. | 403/62 |
| 5,932,940 A | | 8/1999 | Epstein et al. | 310/40 |
| 5,992,700 A | | 11/1999 | McGlothlin et al. | 222/187 |
| 6,620,537 B2 | * | 9/2003 | Struthers et al. | 429/19 |

FOREIGN PATENT DOCUMENTS

EP 0859143 8/1998

* cited by examiner

Primary Examiner—Hoang Nguyen
(74) Attorney, Agent, or Firm—Fulbright & Jaworski LLP (57) ABSTRACT

Systems and methods involving monopropellant and hypergolic powered proportional actuators that may be used in applications such as robotics. A blowdown tank delivers fuel to a reaction site, produce gaseous products. Those gaseous products are transported to a pressure reservoir or directly to the actuator. The gaseous products are controllably introduced into the actuator to actuate a piston. The piston may be used to power a host of devices including robots.

31 Claims, 4 Drawing Sheets

MONOPROLELLANT/HYPERGOLIC POWERED PROPORTIONAL ACTUATOR

This application is a national phase application under 35 U.S.C. § 371 of International Application No. PCT/US02/30778 filed 26 Sep. 2002, which claims priority to U.S. Provisional Application No. 60/325,312 filed 27 Sep. 2001, the contents of which are incorporated herein by reference in their entirety.

BACKGROUND OF THE INVENTION

1. Field of the Invention

The present invention relates generally to the fields of monopropellants, hypergolic bipropellants, robotic actuators, and robotic power sources. More particularly, it concerns the use of a monopropellant or hypergolic bipropellant to power a robotic actuator. Even more particularly, the liquid fuels are utilized to generate gaseous products, which are in turn used to proportionally control the force or motion of a gas actuator.

2. Description of Related Art

A major concern facing those who design and build untethered mobile robots involves finding a suitable source of power and actuation for those robots. Note that unlike an engine, an actuator is characterized by controllable positive and negative power output across a bandwidth that typically spans from DC to several Hertz. Unlike tethered robots, untethered robots are not permanently connected to one or more power sources. Thus, untethered robots typically rely upon power that is carried upon the robot itself. The power supply most often used for untethered robots is battery power. Although battery power is effective in its own rite, it suffers from significant shortcomings.

Specifically, electrochemical batteries contain insufficient mass specific energy density to perform human-scale work for extended periods of time. For example, one of the more advanced current mobile robots—Honda's P-3 Humanoid Robot—has an operation time of only 15–25 minutes, depending on its workload. Operation times of this magnitude or smaller are not uncommon and represent one major technological roadblock for designing mobile robots that can operate remotely for extended periods of time. It should be noted that a trade-off generally exists between the mass-specific energy density and power density of current electrochemical battery technology. That is, batteries that provide relatively high energy densities typically suffer from relatively low power densities, and vice-versa. Therefore, though certain high energy density batteries do exist, they are generally incapable of providing the power required for human-scale mechanical tasks.

Electric motors are the most common type of actuator that would be used with batteries. For purposes of robotics, the peak mechanical power output of a motor is in a high speed and low torque regime, whereas robot motion is in a relatively low speed and high torque regime. Therefore, appropriate use of electric motors in robots generally requires a speed-reducing gearbox, which increases the size and weight of the actuation package.

An additional drawback to robotic actuation with electric motors is the fact that they consume electrical power in order to dissipate mechanical power. That is, robotic actuators must often absorb mechanical power from a load (e.g., lowering a payload under the influence of gravity). Rather than absorb that energy, an electric motor requires electric current for instantaneous control of torque, which in turn requires electrical power to dissipate mechanical power. Electric motors are therefore energetically expensive robotic actuators.

Hydraulic actuators can be used to transmit hydraulic power into mechanical power, but they require a source of hydraulic power. Hydraulic power must in turn be provided by a hydraulic pump, which is typically either electrically powered (i.e., battery powered) or fuel powered (i.e., gasoline or diesel engine powered). These systems are typically too heavy for human scale robots.

Internal combustion engines can also be used as a source of power for mobile robots. Such an engine cannot be used directly, since the output cannot be force or motion controlled over the bandwidths typically required of human-scale robots. An engine can, however, be utilized to drive a hydraulic or pneumatic pump or compressor to power a fluid-powered system, or alternatively to drive a generator to provide power for an electrically powered system. The added complexity of such systems, however, degrades the overall system energy density.

In view of shortcomings such as those outlined above, it is apparent that a better source of controllable power for use with untethered mobile robots would be desirable. This disclosure demonstrates that a better power and actuation source involves the use of monopropellants or hypergolic bipropellants. Although monopropellants (or hypergolic bipropellants) have been used as fuel-types in specialized applications, their potential has not been realized for use with untethered mobile robots until this invention.

U.S. Pat. No. 4,825,819 involves a fluid-powered actuator with a slidable piston. This patent essentially describes the operation of a bistable pilot-operated valve. Specifically, the valve draws from the primary fluid stream of fuel and oxidizer (or monopropellant) to switch a primary stream valve into either an on or off position. The actuator is therefore designed to move to one position or the other, and unlike the actuator described in this application, cannot provide proportional force or motion control. In other words, no disclosure is present to suggest how one can use monopropellants to continuously vary the output of one or more robotic actuators.

U.S. Pat. No. 5,992,700 involves an infusion device including a pressure containment pouch. In certain embodiments of the disclosure, gas is generated by drawing an aqueous solution of a peroxide or superoxide into an absorbent tablet that contains an enzyme or catalyst which promotes the decomposition of the peroxide or superoxide to decomposition products including oxygen gas. Although useful for applications such as medicine, this reference likewise does not disclose or suggest mechanisms whereby monopropellants may be used as a useful power source for untethered mobile robots.

U.S. Pat. No. 3,601,827 involves a self-contained underwater buoyancy system including a fuel tank containing a monopropellant fuel and a gas generator assembly that has a main body portion housing a catalyst bed that causes the monopropellant fuel to turn into a gas. The buoyancy system allows users to control buoyancy so that, a load of 1,000 pounds may be lifted at a depth of 150 feet. Although useful as applied to assisting underwater lifting, this reference does not disclose or suggest principles necessary to implement monopropellant power supplies in untethered mobile robots.

U.S. Pat. No. 5,932,940 involves a micro-gas turbine engine. The disclosure contemplates a wide range of propellant combinations, including monopropellants, such as hydrazine and hydrogen peroxide, which are preferably employed with the addition of a catalyst. This reference also does not disclose or suggest principles necessary to implement monopropellant power supplies in untethered mobile robots.

U.S. Pat. No. 3,581,504 involves a gas generator including an inlet for admitting a monopropellant. The disclosed gas generator provides a pressure-amplifying staged expansion cycle wherein relatively low pressure monopropellant is pumped by an impeller to a higher pressure. The monopropellant is then decomposed in the presence of a catalyst to produce a higher pressure exhaust gas. The disclosure states that a suitable monopropellant is hydrogen peroxide. Although useful to assist in techniques for pressure amplification, this reference does not disclose or suggest the applications discussed and claimed herein involving the use of monopropellants as power sources for robotics.

U.S. Pat. No. 5,807,011 involves a foot system for a walking robot. This disclosure describes a cylindrical connection member disposed at a center portion of the foot system for being connected to a leg system. It also describes a shock absorber supporting member and front and rear toes pivotally connected to an ankle member. Useful as particular robotic foot design, this reference, however, does not involve the use of monopropellants as power sources as discussed and claimed herein.

European Patent Application EP 0859143 involves a single stage monopropellant pressurization system wherein a monopropellant is stored within a tank. A gas generator supplied by the tank generates warm gas to pressurize other tanks. Disclosed monopropellants include hyrazine or monomethyl hydrazine or a combination of these fuels and possibly other additives such as water. Similar to the other references mentioned above, this reference does not disclose or suggest the technology discussed and claimed herein.

In summary, although conventional techniques may offer their own significant advantages, they, however, suffer from shortcomings as well. In particular, conventional technology does not disclose or suggest how to fully take advantage of monopropellant power sources. More particularly, conventional technology does not disclose or suggest how one could use monopropellant (or hypergolic bipropellant) sources of fuel to drive robotic actuators so that a more efficient, effective untethered mobile robot can be realized. The shortcomings of conventional technology, however, are addressed by the techniques disclosed and claimed below.

SUMMARY OF THE INVENTION

Embodiments of the present invention overcome problems mentioned above by utilizing monopropellants or hypergolic bipropellants to power robotic actuators in an effective manner. In one embodiment, a system utilizes a liquid monopropellant, such as hydrogen peroxide ($H_2O_2$) or a HAN (hydroxyl ammonium nitrate)-based fuel, as a gas generator used to power a pneumatic-type actuator. Such an embodiment may be implemented by storing the liquid monopropellant in a pressurized tank and releasing it through a control valve onto a catalyst, which causes a reaction that generates gaseous products. The flow of pressurized gaseous products may then be controlled through the use of proportional flow valves to control the motion or force output of an actuator. Other embodiments are described in the following section.

Unlike the combustion of hydrocarbon fuels, this approach does not require premixing, pre-compression, or an ignition system in order to generate gaseous products. Additionally, the monopropellant approach enables flow control of the liquid state rather than the gaseous state of the fuel, which greatly decreases energy loss from flow control, and greatly simplifies the design of the flow control valve (i.e., it significantly decreases the flow rate passing through the valve). The analogous procedure cannot be accomplished electrically or with any other conventional form of power control.

In one respect, the invention is a centralized monopropellant actuator system that includes a blowdown fuel tank, a pressure reservoir, a centralized catalyst pack, a multi-chamber piston actuator, and two or more valves. As used herein, the plural "valves" shall be interpreted broadly to refer to any structure having more than one mechanism or pathway for regulating flow. As used in this disclosure, therefore, "valves" may properly describe (but would not be limited to) even a single three or four-way valve. The blowdown fuel tank has a first section that is pre-pressurized with inert gas and a second section that contains a monopropellant. The pressure reservoir is coupled to the second section of the blowdown fuel tank. The centralized catalyst pack is coupled to the second section of the blowdown fuel tank and is configured to release gaseous products into the pressure reservoir. The multi-chamber piston actuator is coupled to the pressure reservoir. The two or more valves are coupled to the actuator and are configured to control the flow of the gaseous products into chambers of the actuator to create controllable forces upon the piston.

In other respects, the monopropellant may be hydrogen peroxide. The monopropellant may be hydroxyl ammonium nitrate. The inert gas may be nitrogen. The system may also include one or more fuel valves coupled to the blowdown fuel tank and pressure reservoir. Those one or more fuel valves may be automatically controllable according to the pressure of the blowdown fuel tank and the pressure of the pressure reservoir. The centralized catalyst pack may include pellets coated or plated with a catalyzing agent. The centralized catalyst pack may be external to the pressure reservoir. The centralized catalyst pack, on the other hand, may be inside the pressure reservoir. The two or more valves of the system may include two inlet valves coupled to two inlet ports of the actuator and two exhaust valves coupled to two exhaust ports of the actuator.

In another respect, the invention is an untethered mobile robot including the centralized monopropellant actuator system described above. In yet another respect, the invention is a method for creating controllable forces upon an actuator by using that centralized monopropellant actuator system.

The invention is also a distributed monopropellant actuator system that includes a blowdown fuel tank, a multi-chamber piston actuator, and two or more distributed catalyst packs. The blowdown fuel tank has a first section that is pre-pressurized with inert gas and a second section that contains a monopropellant. The multi-chamber piston actuator is coupled to the blowdown fuel tank by two or more fuel valves. The two or more distributed catalyst packs are coupled to the two or more fuel valves and are configured to release gaseous products into chambers of the actuator to create controllable forces upon the piston.

In other respects, the distributed catalyst packs may be integrated into the actuator. The distributed catalyst packs, on the other hand, may be external to the actuator. The system described above may also include two exhaust valves coupled to two exhaust ports of the actuator.

In another respect, the invention is an untethered mobile robot including the distributed monopropellant actuator system described above. In yet another respect, the invention is a method for creating controllable forces upon an actuator comprising by using that distributed monopropellant actuator system.

In another respect, the invention is a centralized hypergolic bipropellant actuator system including a blowdown fuel tank, a blowdown oxidizer tank, a pressure reservoir, a multi-chamber piston actuator, and four or more valves. The blowdown fuel tank has a first section that is pre-pressurized with inert gas and a second section that contains a fuel. The blowdown-oxidizer tank has a first section that is pre-pressurized with inert gas and a second section that contains an oxidizer. The pressure reservoir is coupled to each blowdown tank and is configured to accept gaseous products from a controlled reaction of the fuel and oxidizer. The multi-chamber piston actuator is coupled to the pressure reservoir. The four or more valves are coupled to the actuator and are configured to control the flow of the gaseous products into chambers of the actuator to create controllable forces upon the piston.

In other respects, the four or more valves may include four inlet valves coupled to two inlet ports of the actuator and two exhaust valves coupled to two exhaust ports of the actuator.

In another respect, the invention is an untethered mobile robot including the centralized hypergolic bipropellant actuator system described above. In yet another respect, the invention is a method for creating controllable forces upon an actuator by using that centralized hypergolic bipropellant actuator system.

In another respect, the invention is a distributed hypergolic bipropellant actuator system including a blowdown fuel tank, a blowdown oxidizer tank, and a multi-chamber piston actuator. The blowdown fuel tank has a first section that is pre-pressurized with inert gas and a second section that contains a fuel. The blowdown oxidizer tank has a first section that is pre-pressurized with inert gas and a second section that contains an oxidizer. The multi-chamber piston actuator is coupled to each blowdown tank by four or more fuel valves, and the valves are configured to controllably mix and react the fuel and oxidizer to release gaseous products into chambers of the actuator to create controllable forces upon the piston.

In other respects, the system may also include two exhaust valves coupled to two exhaust ports of the actuator.

In another respect, the invention is an untethered mobile robot comprising the distributed hypergolic bipropellant actuator system described above. In yet another respect, the invention is a method for creating controllable forces upon an actuator by using that distributed hypergolic bipropellant actuator system.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. These drawings illustrate by way of example and not limitation, and they use like references to indicate similar elements. The drawings include.

DESCRIPTION OF ILLUSTRATIVE EMBODIMENTS

Embodiments described herein are applicable to a wide range of different industrial applications. Foremost, the monopropellants can be used to power robotic actuators. However, with the benefit of this disclosure, it will be apparent that this technology is applicable to many other ends. For instance, it may be used for any self-powered application requiring a high energy and power density control actuator.

In one embodiment, an actuation system may provide direct chemical to mechanical energy conversion from an energy source that is approximately an order of magnitude more energy dense and power dense than the best commercially available lithium-thionyl-chloride or lithium-manganese-dioxide electrochemical batteries. This embodiment utilizes monopropellants such as, but not limited to, hydrogen peroxide ($H_2O_2$) or Hydroxyl Ammonium Nitrate (HAN) formulations to maintain a high-pressure pneumatic reservoir. This reservoir, in turn, may be utilized as a controllable power source for a system of pneumatic actuators.

Figure 1A:
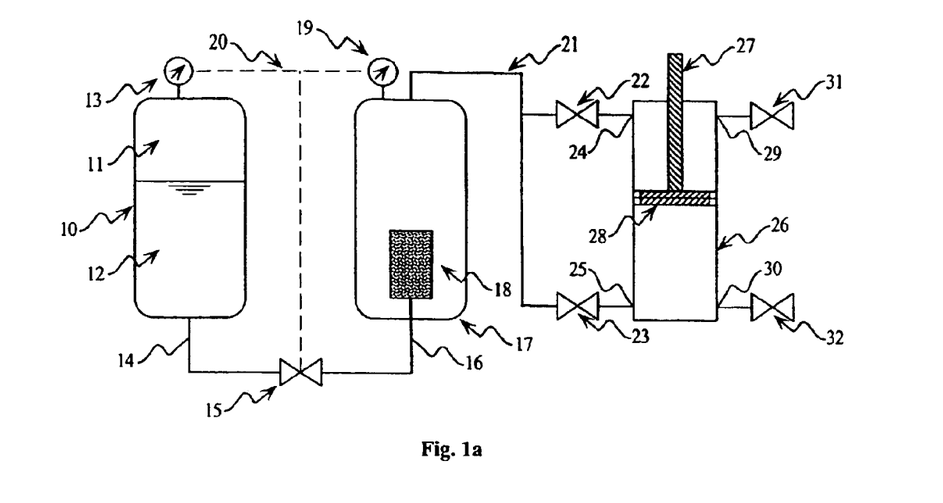
FIG. 1A is a schematic diagram of a centralized monopropellant powered actuator embodiment. In the figure, the monopropellant is shown for purposes of illustration powering a linear pneumatic cylinder-type actuator. The concept is generalizable to any fluid-powered actuator, such as rotary vein-type actuators, etc.
Figure 1B:
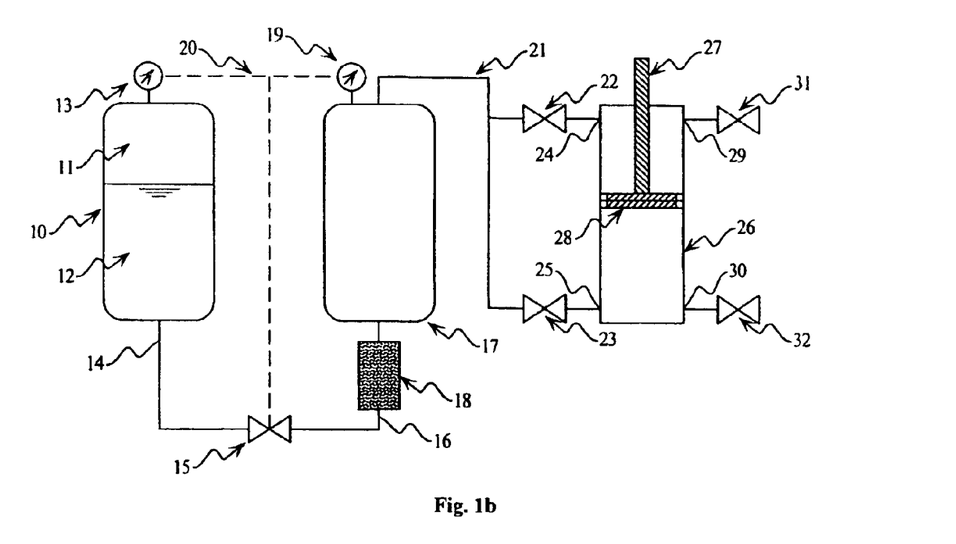
FIG. 1B is a schematic diagram of a variant of FIG. 1A with a catalyst pack external to the pressure tank.
Figures 1C, 2A:
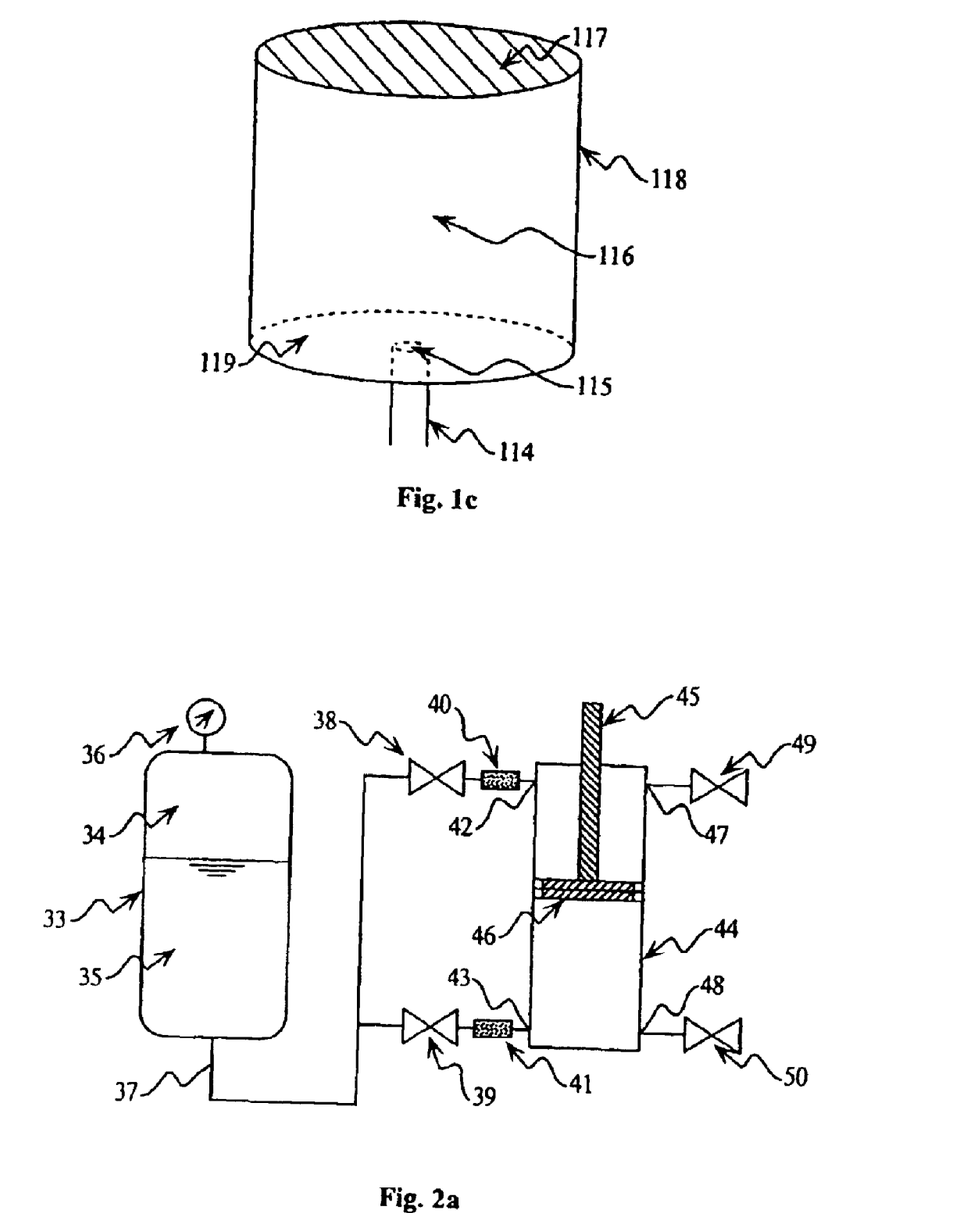
FIG. 1C is a detail of the catalyst pack of FIG. 1*a*.
FIG. 2A is a schematic diagram of a distributed monopropellant powered actuator embodiment.

First Embodiment (FIGS. 1A–1C)

FIG. 1A illustrates a centralized monopropellant actuator embodiment. In this embodiment, the chemical energy of a monopropellant is released and stored in a central location and used to drive one or more pneumatic-type actuators. To this end, a blowdown fuel tank 10 is pre-pressurized with nitrogen or other inert gas 11 such that a monopropellant 12 is maintained at a sufficiently high pressure as measured by the pressure gage 13. The flow of monopropellant through a fuel line 14 is controlled by either a proportional or on/off liquid valve 15. Being driven by the higher pressure of the fuel tank 10, the monopropellant flows through line 14, through valve 15 (if it is open or partially open), and through line 16. Line 16 enters the pressure reservoir 17 where the monopropellant disassociates and expands into gaseous products within the catalyst pack 18. After disassociation, the gaseous products flow through the top of the screened surface of 18 into the pressure reservoir 17. The control of valve 15 is dictated by an automatic control law dependent upon pressure sensors 13 and 19 (as indicated by dashed line 20) such that a desired pressure is maintained within the pressure reservoir 17.

Upon maintaining a desired high pressure within the pressure reservoir 17, the gaseous products flow through line 21 and flow through proportional valves 22 and 23 into the chambers of a pneumatic-type actuator 26 via inlet ports 24 and 25. The pressure developed within the chambers of 26, due the flow of gaseous product through inlets 24 and 25, create controllable forces on piston 28 resulting in the delivery of controlled positive mechanical power and subsequent controlled force or motion of plunger 27. Conversely, gaseous product can flow through exhaust ports 29 and 30 in a proportional manner as governed by proportional valves 31 and 32 resulting in the controlled dissipation of mechanical power via plunger 27. With the benefit of the present disclosure, those having skill in the art will recognize that the valve design may be modified to incorporate, for instance, three-way or four-way valves. For instance, valves 22, 23, 31, and 32 may be achieved using a four-way spool valve.

FIG. 1B shows a variant of FIG. 1A where the catalyst pack 18 is external to the pressure reservoir 17. Depending on the desired configuration of the device, the variant shown in FIG. 1B may be more desirable than the catalyst pack being integrated within the pressure reservoir as shown in FIG. 1A.

FIG. 1C shows details of the catalyst pack of FIG. 1A. A line 114 (same as line 16 in FIG. 1a) delivers liquid monopropellant to the catalyst pack. The monopropellant enters the catalyst pack through a screen 115 (or other geometry transparent to the flow of liquid). The inside of the catalyst pack 116 contain pellets (not shown), or other geometry, coated or plated with a catalyzing agent. Being exposed to the catalytic surface of the pellets, the liquid monopropellant disassociates into a gaseous product and is allowed to escape the catalyst pack through a screened surface 117. All other surfaces such as 118 and 119 are either solid or screened such that the catalyzing agent is contained within the catalyst pack.

Second Embodiment (FIGS. 2A–2D)

FIG. 2A illustrates a distributed monopropellant actuator embodiment. In this embodiment, the chemical energy of a monopropellant is distributed to one or more pneumatic-type actuators and released in a controlled manner inside the appropriate cylinder of the appropriate actuator. Shown in FIG. 2A is a blowdown fuel tank 33 pre-pressurized with an inert gas 34 and containing a monopropellant 35. This fuel tank 33 is instrumented with a pressure sensor 36 such that the pressure of the monopropellant liquid can be monitored. The liquid monopropellant is delivered via line or lines 37 to various pneumatic-type actuators (such as 44). Proportional valves 38 or 39 control the flow of monopropellant such that it flows through a catalyst pack 40 and/or 41. The catalyst packs contain catalytic agents such that the monopropellant may flow into, disassociate inside, and flow out of the pack without the catalytic agent being allowed to escape. The gaseous products of the monopropellant produced inside the catalyst packs flows through inlets 42 and 43 into the chambers of a pneumatic-type actuator 44. In a similar manner as discussed in FIG. 1A of the first embodiment, the gaseous products are capable of delivering positive mechanical power, or dissipating negative mechanical power through piston 46 and plunger 45. Exhaust ports 47 and 48 and proportional valves 49 and 50 are similar to those discussed in FIG. 1A. With the benefit of the present disclosure, those having skill in the art will recognize that the valve design may be modified to incorporate, for instance, three-way or four-way valves. For instance, valves 38 and 39 may be achieved using a three-way valve. The same is true for valves 49 and 50.

Figure 2B:
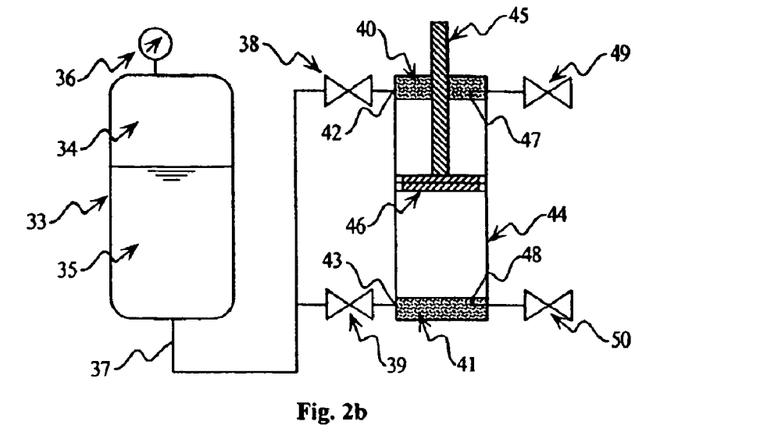
FIG. 2B is a schematic diagram of a variant of FIG. 2A with the catalyst packs integrated into the actuator housing.
Figure 2C:
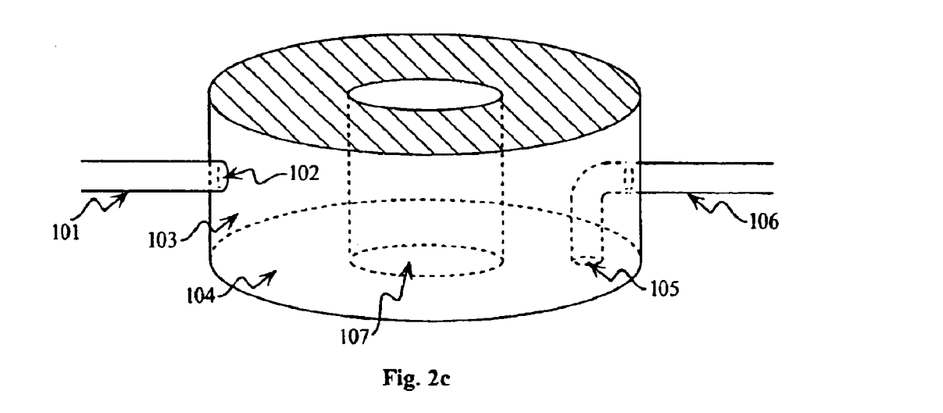
FIGS. 2C and 2D are schematic diagrams showing details of the catalyst arrangement in FIG. 2B.

FIG. 2B shows a variant for FIG. 2A where the catalyst packs 40 and 41 are integrated into the pneumatic-type actuator. FIG. 2C shows a detail of the integrated catalyst pack (shown as 40 in FIG. 2B). The inlet line 101 allows liquid monopropellant to enter the catalyst pack via a screen (or other geometry) 102. The inside of the catalyst pack 103 is filled with pellets coated or plated with a catalytic agent (not shown). Surface 104 is screened or otherwise vented such that the gaseous products of the monopropellant are allowed to escape into the upper chamber of the pneumatic cylinder. This upper catalyst pack is of annular shape such that the plunger (45 in FIG. 2A) is unobstructed by the pack by passing through orifice 107. The contents of the upper chamber of the pneumatic-type actuator are allowed to exhaust through opening 105 and flow through line 106 such that the exhaust does not pass through the catalytic agent (as it would impart an unwanted flow restriction).

Figure 2D:
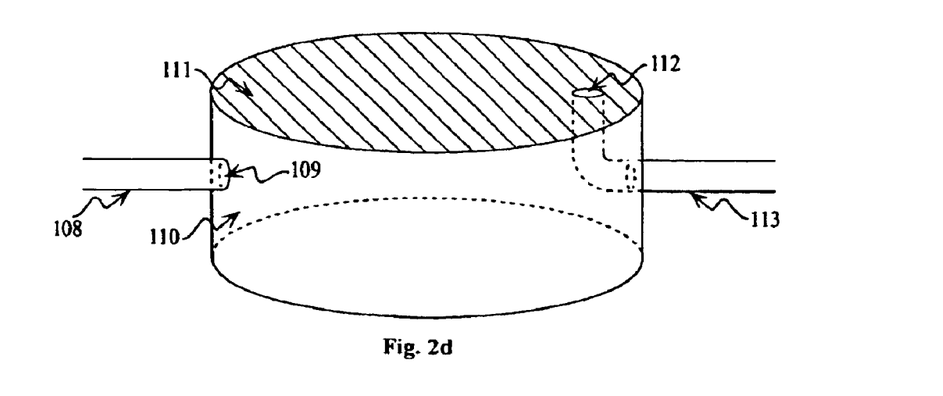

FIG. 2D shows a similar catalyst pack for the lower chamber of a pneumatic-type actuator (for which there is no connecting plunger to the piston). The inlet 108. The screened opening 109. The interior of the catalyst pack 110 filled with pellets (not shown). The screened surface is 111. The exhaust opening is 112. The exhaust line is 113.

Figure 3:
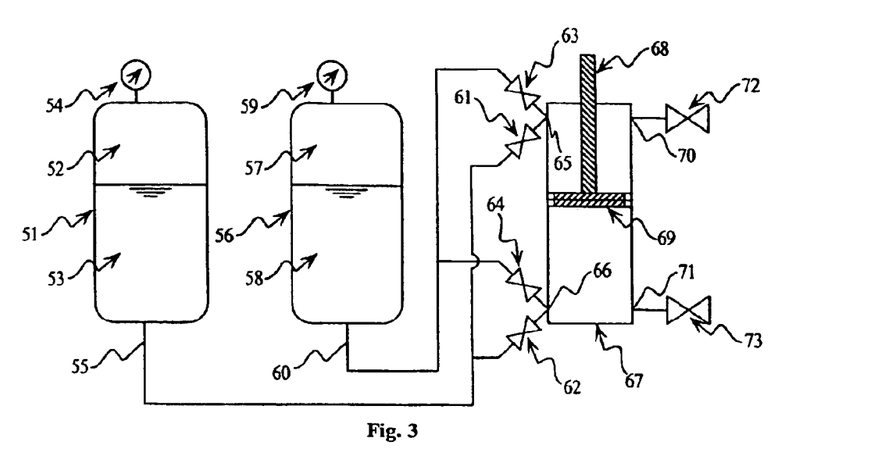
FIG. 3 is a schematic diagram of a distributed hypergolic bipropellant powered actuator embodiment.

Third Embodiment (FIG. 3)

FIG. 3 illustrates a distributed hypergolic bipropellant powered actuator embodiment. In this embodiment, a liquid (or gaseous) fuel and a liquid (or gaseous) oxidizer constituting a hypergolic bipropellant mixture are delivered to one or more pneumatic-type actuators. The chemical energy of the fuel is released upon contact with the oxidizer locally within each actuator. With regard to a liquid fuel and liquid oxidizer, FIG. 3 illustrates one possible configuration of this embodiment. A blowdown fuel tank 51 is pre-pressurized with an inert gas 52 such that the fuel 53 is under pressure and is monitored by pressure sensor 54. A similar blowdown tank 56 contains a pre-pressurized inert gas 57 such that the oxidizer 58 is under pressure and is monitored by pressure sensor 59. Fuel and oxidizer is transported to a pneumatic-type actuator via lines 55 and 60 respectively. Proportional control valves 61 and 62 control the flow of fuel while proportional control valves 63 and 64 control the flow of oxidizer to each chamber of a pneumatic-type actuator 67. Upon mixing and reacting in a controlled manner at inlet ports 65 and 66, the gaseous reaction products cause an increase of pressure within either the upper or lower chamber of the actuator and consequently deliver a controlled force to piston 69. This force delivers positive mechanical power to the environment via plunger 68. In an analogous manner as described in the first and second embodiments, mechanical power is dissipated via exhaust posts 70 and 71 and the control of proportional exhaust valves 72 and 73.

Figure 4:
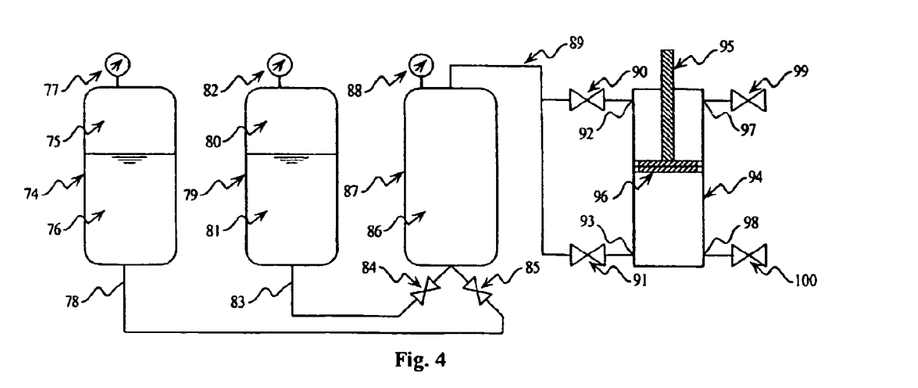
FIG. 4 is a schematic diagram of a centralized hypergolic bipropellant powered actuator embodiment.

Fourth Embodiment (FIG. 4)

FIG. 4 illustrates a centralized hypergolic bipropellant powered actuator embodiment. In this embodiment, a liquid (or gaseous) fuel and a liquid (or gaseous) oxidizer constituting a hypergolic bipropellant mixture are delivered to a centralized pressure reservoir. The chemical energy of the fuel is released upon contact with the oxidizer within the reservoir. The pressure within the reservoir is then used to drive one or more pneumatic-type actuators. The fuel and oxidizer tanks are similar to those described in the third embodiment where 74, 75, 76, 77, 79, 80, 81, and 82 are similar to 51, 52, 53, 54, 56, 57, 58, and 59 of FIG. 3. Fuel and oxidizer flows through lines 78 and 83 respectively to proportional or on/off valves 84 and 85 respectively. Based on pressure sensors 77, 82 and 88, valves 84 and 85 are governed by a control law such that a desired pressure in maintained within the pressure reservoir 87. After passing through valves 84 and 85, fuel and oxidizer come in contact with one another and react to create a high pressure gaseous product within the pressure reservoir 86. The remaining portion of the system is similar to that described in the first embodiment where 89–100 are analogous to 21–32.

Fifth Embodiment (Robotics)

As will be understood by those having skill in the art with the benefit of the present disclosure, any one of the systems described above (or any of the systems acting in combination) can be used as a power source for a myriad of applications—including robotic applications. In particular, the systems may be used to power an untethered mobile robot so that shortcomings discussed in the background of this disclosure can be avoided or eliminated.

Sixth Embodiment (Methods)

As will be understood by those having skill in the art with the benefit of the present disclosure, any one of the systems described above (or any of the systems acting in combination) can be operated as a general method for controlling one or more actuators. These actuators may be installed in a myriad of different devices—including robotic devices as described above. In particular, the systems may be used as a method to power an untethered mobile robot so that shortcomings discussed in the background of this disclosure can be avoided or eliminated.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims.

Moreover, the different aspects of the disclosed apparatus and methods may be utilized in various combinations and/or independently. Thus the invention is not limited to only those combinations shown herein, but rather may include other combinations. Those of skill in the art will understand that numerous other modifications may be made to the disclosed method and apparatus, but all such similar substitutes and modifications are deemed to be within the spirit, scope and concept of the invention.

What is claimed is:

1. A centralized monopropellant actuator system, comprising:
    a blowdown fuel tank having a first section that is pre-pressurized with inert gas and a second section that contains a monopropellant;
    a pressure reservoir coupled to the second section of the blowdown fuel tank;
    a centralized catalyst pack coupled to the second section of the blowdown fuel tank and configured to release gaseous products into the pressure reservoir;
    a multi-chamber piston actuator coupled to the pressure reservoir; and
    two or more valves coupled to the actuator and configured to control the flow of the gaseous products into chambers of the actuator to create controllable forces upon the piston.

2. The system of claim 1, wherein the monopropellant comprises hydrogen peroxide.

3. The system of claim 1, wherein the monopropellant comprises hydroxyl ammonium nitrate.

4. The system of claim 1, wherein the inert gas comprises nitrogen.

5. The system of claim 1, further comprising one or more fuel valves coupled to the blowdown fuel tank and pressure reservoir, the one or more fuel valves being automatically controllable according to the pressure of the blowdown fuel tank and the pressure of the pressure reservoir.

6. The system of claim 1, wherein the centralized catalyst pack comprises pellets coated or plated with a catalyzing agent.

7. The system of claim 1, wherein the centralized catalyst pack is external to the pressure reservoir.

8. The system of claim 1, wherein the centralized catalyst pack is inside the pressure reservoir.

9. The system of claim 1, wherein the two or more valves comprises two inlet valves coupled to two inlet ports of the actuator and two exhaust valves coupled to two exhaust ports of the actuator.

10. An untethered mobile robot comprising the centralized monopropellant actuator system of claim 1.

11. A method for creating controllable forces upon an actuator comprising use of the centralized monopropellant actuator system of claim 1.

12. A distributed monopropellant actuator system, comprising:
    a blowdown fuel tank having a first section that is pre-pressurized with inert gas and a second section that contains a monopropellant;
    a multi-chamber piston actuator coupled to the blowdown fuel tank by two or more fuel valves; and
    two or more distributed catalyst packs coupled to the two or more fuel valves and configured to release gaseous products into chambers of the actuator to create controllable forces upon the piston.

13. The system of claim 12, wherein the monopropellant comprises hydrogen peroxide.

14. The system of claim 12, wherein the monopropellant comprises hydroxyl ammonium nitrate.

15. The system of claim 12, wherein the inert gas comprises nitrogen.

16. The system of claim 12, wherein the distributed catalyst packs comprise pellets coated or plated with a catalyzing agent.

17. The system of claim 12, wherein the distributed catalyst packs are integrated into the actuator.

18. The system of claim 12, wherein the distributed catalyst packs are external to the actuator.

19. The system of claim 12, further comprising two exhaust valves coupled to two exhaust ports of the actuator.

20. An untethered mobile robot comprising the distributed monopropellant actuator system of claim 12.

21. A method for creating controllable forces upon an actuator comprising use of the distributed monopropellant actuator system of claim 12.

22. A centralized hypergolic bipropellant actuator system, comprising:
    a blowdown fuel tank having a first section that is pre-pressurized with inert gas and a second section that contains a fuel;
    a blowdown oxidizer tank having a first section that is pre-pressurized with inert gas and a second section that contains an oxidizer;
    a pressure reservoir coupled to each blowdown tank and configured to accept gaseous products from a controlled reaction of the fuel and oxidizer;
    a multi-chamber piston actuator coupled to the pressure reservoir; and
    four or more valves coupled to the actuator and configured to control the flow of the gaseous products into chambers of the actuator to create controllable forces upon the piston.

23. The system of claim 22, wherein the inert gas comprises nitrogen.

24. The system of claim 22, wherein the four or more valves comprises four inlet valves coupled to two inlet ports of the actuator and two exhaust valves coupled to two exhaust ports of the actuator.

25. An untethered mobile robot comprising the centralized hypergolic bipropellant actuator system of claim 22.

26. A method for creating controllable forces upon an actuator comprising use of the centralized hypergolic bipropellant actuator system of claim 22.

27. A distributed hypergolic bipropellant actuator system, comprising:
- a blowdown fuel tank having a first section that is pre-pressurized with inert gas and a second section that contains a fuel;
- a blowdown oxidizer tank having a first section that is pre-pressurized with inert gas and a second section that contains an oxidizer;
- a multi-chamber piston actuator coupled to each blowdown tank by four or more fuel valves, the valves configured to controllably mix and react the fuel and oxidizer to release gaseous products into chambers of the actuator to create controllable forces upon the piston.

28. The system of claim 27, wherein the inert gas comprises nitrogen.

29. The system of claim 27, further comprising two exhaust valves coupled to two exhaust ports of the actuator.

30. An untethered mobile robot comprising the distributed hypergolic bipropellant actuator system of claim 27.

31. A method for creating controllable forces upon an actuator comprising use of the distributed hypergolic bipropellant actuator system of claim 27.

* * * * *